United States Patent
Su et al.

(10) Patent No.: US 7,795,855 B2
(45) Date of Patent: Sep. 14, 2010

(54) POWER MANAGEMENT APPARATUS HAVING AN EXTENDED SAFE OPERATION REGION AND OPERATION METHOD THEREOF

(75) Inventors: Hung-Der Su, Luju Township, Kaohsiung County (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 570 days.

(21) Appl. No.: 11/826,449

(22) Filed: Jul. 16, 2007

(65) Prior Publication Data
US 2008/0018177 A1 Jan. 24, 2008

(30) Foreign Application Priority Data
Jul. 18, 2006 (TW) .............................. 95126287 A

(51) Int. Cl.
*G05F 1/40* (2006.01)

(52) U.S. Cl. ........................................ 323/284; 323/271

(58) Field of Classification Search ................. 323/271, 323/282–284, 351; 363/131
See application file for complete search history.

(56) References Cited

U.S. PATENT DOCUMENTS

| | | | |
|---|---|---|---|
| 6,191,562 B1 * | 2/2001 | Mueller et al. | 323/282 |
| 6,414,370 B1 * | 7/2002 | Nagasu et al. | 257/575 |
| 6,747,441 B2 * | 6/2004 | Johnson et al. | 323/282 |
| 6,922,041 B2 * | 7/2005 | Goder et al. | 323/275 |
| 2007/0170897 A1 * | 7/2007 | Williams | 323/222 |

* cited by examiner

*Primary Examiner*—Jessica Han
(74) *Attorney, Agent, or Firm*—Rosenberg, Klein & Lee

(57) ABSTRACT

Two step driving technique is used to turn on the power switch of a power management apparatus in such a manner that the power switch is weakly turned on first and then goes into a low ON-resistance region. The power switch is so avoided to operate at highest gate and drain voltages simultaneously even a non-uniform turn on happens, and is thereby away from avalanche breakdown. The safe operation region of the power management apparatus is therefore extended with minimum efficiency degradation.

17 Claims, 18 Drawing Sheets

POWER MANAGEMENT APPARATUS HAVING AN EXTENDED SAFE OPERATION REGION AND OPERATION METHOD THEREOF

FIELD OF THE INVENTION

The present invention is related generally to a power management apparatus and, more particularly, to a power management apparatus having an extended safe operation region and an operation method thereof.

BACKGROUND OF THE INVENTION

The combination of conduction currents and high fields in a MOSFET will lead to impact ionization, causing a non-ideality presenting as a monotonically increasing drain current with drain voltage. It may result in a device malfunction when the device operates in high gate and drain bias condition, for example, see Cornell, M. E., Williams, R. K., and Yilmaz, H., "Impact Ionization in Saturated High-Voltage LDD Lateral DMOS FETs", Proceedings of the 3rd International Symposium on Power Semiconductor Devices and ICs, pp. 164-167, April 1991. This impact ionization would cause an avalanche breakdown of the power switch in a power management apparatus such as boost circuit, buck circuit and inverter circuit, when the power switch is turning on fast to maintain high efficiency. In further detail, referring to FIG. 1, a boost circuit 100 comprises a PWM controller and logic 102 for producing a control signal, a drive circuit 104 connected to the PWM controller and logic 102 for producing a drive signal according to the control signal, and a power output stage 101 connected between a power input VIN and ground GND for converting the input voltage VIN to an output voltage VOUT according to the drive signal provided by the drive circuit 104. The drive circuit 104 includes a driver 106 connected to the PWM controller and logic 102 and a buffer unit 109 connected between the driver 106 and the power output stage 101. The buffer unit 109 includes inverter gates 108 and 110 coupled in series and connected with an operation voltage PVDD. The power output stage 101 includes a power switch 112 connected between a phase node 114 and ground GND, and is alternatively turned on and off by the drive signal, an inductor 116 connected between the power input VIN and the phase node 114 to store and release energy by turning on and off the power switch 112, and a rectifier diode 118 connected between the phase node 114 and the power output VOUT for maintaining a current I flowing from the phase node 114 to the power output VOUT. FIG. 2 shows an implementation of the power switch 112, in which a plurality of NMOS transistors 120-124 are parallel connected together in such a manner that all the drains are connected to the phase node 114, all the sources are connected to ground GND, and all the gates are connected together. However, although such configuration can be regarded as an equivalent NMOS switch for the power switch 112, there are always parasitic resistors 126-128 each between two adjacent gates and parasitic capacitors 130-132 each between a gate and ground GND in the chip. The parasitic resistors 126-128 and capacitors 130-132 may result in non-uniform turn on of the NMOS 120-124. FIG. 3 shows the I-V curves of the power switch 112 when it is driven. Referring to FIGS. 2 and 3, when the power switch 112 is fast turning on, the first NMOS transistor 120 will be turned on first, and the other NMOS transistors 122-124 will not be turned on at the same time due to the RC delays, resulting in the real I-V curve 138 deviated from the ideal I-V curve 136, and thereby the earlier turned on NMOS transistor 120 operating in a high gate and drain bias region 134. This high gate and drain bias condition will easily result in impact ionization in the turned on NMOS 120, and further cause an avalanche breakdown thereof and thereby device failure. To improve thereto, conventionally, the power switch 112 is slowly turned on or the manufacturing process of the power switch 112 is improved, in order to eliminate the non-uniform turning on of the power switch 112. However, slow turn on of the power switch 112 will increase the state transition time of the power management apparatus 100, thereby causing efficiency degradation, and improved manufacturing process of the power switch 112 could merely reduce the parasitic resistors 126-128 and the parasitic capacitors 130-132, but couldn't eliminate them completely, even with considerable cost and time.

Therefore, it is desired a high efficiency and low cost power management apparatus having an extended safe operation region and an operation method thereof.

SUMMARY OF THE INVENTION

An object of the present invention is to extend the safe operation region of a power management apparatus with minimum efficiency degradation.

Another object of the present invention is to provide a high efficiency and low cost power management apparatus.

According to the present invention, a power management apparatus comprises a PWM controller and logic for producing a control signal, a drive circuit connected to the PWM controller and logic for producing a drive signal according to the control signal, a power output stage having a phase node with a phase voltage thereon for producing an output voltage according to the drive signal, and an adjusting circuit connected to the drive circuit for adjusting the drive signal according to the phase voltage so as to extend the safe operation region of the power management apparatus.

According to the present invention, an operation method for a power management apparatus including a NMOS switch having a drain connected to a phase node with a phase voltage thereon, comprises providing a first drive signal to drive the NMOS switch when the phase voltage is high, such that the NMOS switch is weakly turned on, and providing a second drive signal to drive the NMOS switch when the phase voltage is low, such that the NMOS switch goes into a low ON-resistance region, wherein the voltage level of the second drive signal is higher than that of the first drive signal.

According to the present invention, an operation method for a power management apparatus including a PMOS switch having a drain connected to a phase node with a phase voltage thereon, comprises providing a first drive signal to drive the PMOS switch when the phase voltage is low, such that the PMOS switch is weakly turned on, and providing a second drive signal to drive the PMOS switch when the phase voltage is high, such that the PMOS switch goes into a low ON-resistance region, wherein the voltage level of the second drive signal is lower than that of the first drive signal.

In an aspect of the present invention, an adjusting circuit is used for a drive circuit to produce a drive signal with different voltage levels, so as to implement a two step driving for a power switch in a power output stage of a power management apparatus, by which the power switch is weakly turned on first and then goes into a low ON-resistance region. Therefore, the power switch is prevented from avalanche breakdown, and the safe operation region of the power management apparatus is extended with minimum efficiency degradation.

BRIEF DESCRIPTION OF DRAWINGS

The present invention can be more fully understood by reading the subsequent detailed description and examples with references made to the accompanying drawings; wherein.

DETAILED DESCRIPTION OF THE INVENTION

Figure 1:
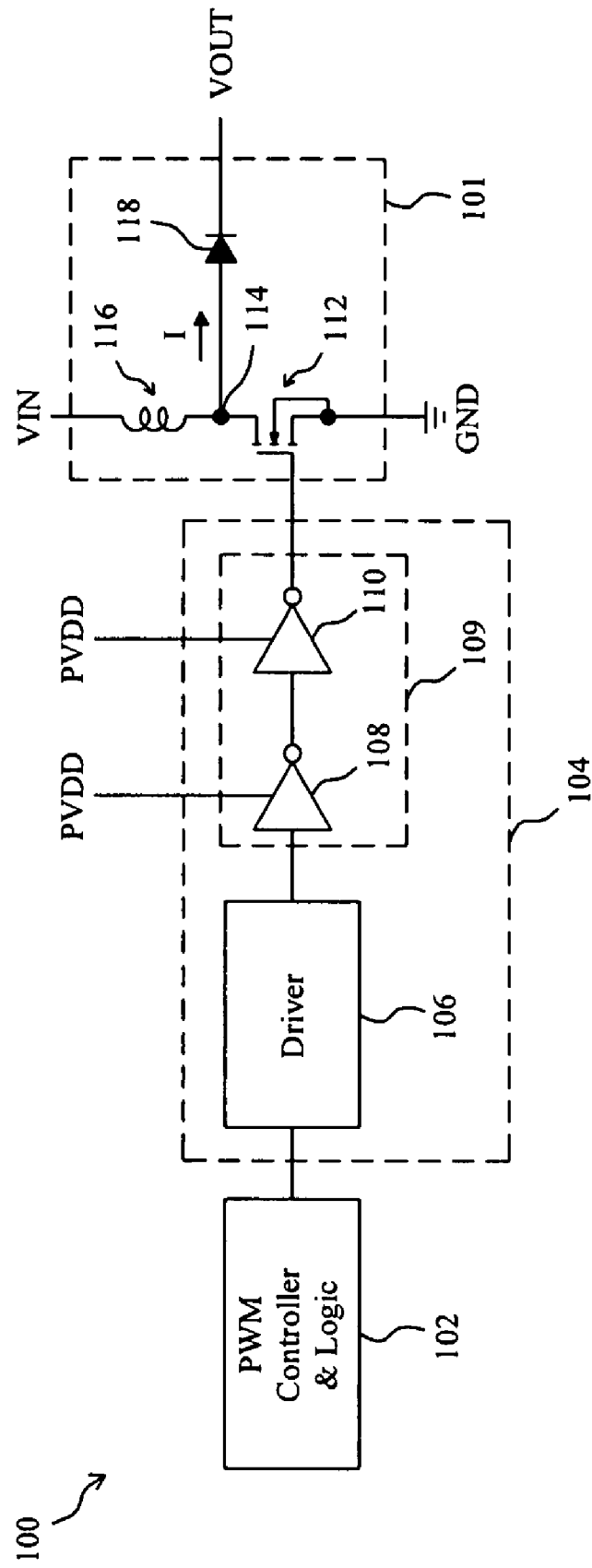
FIG. 1 shows a conventional boost circuit.
Figure 2:
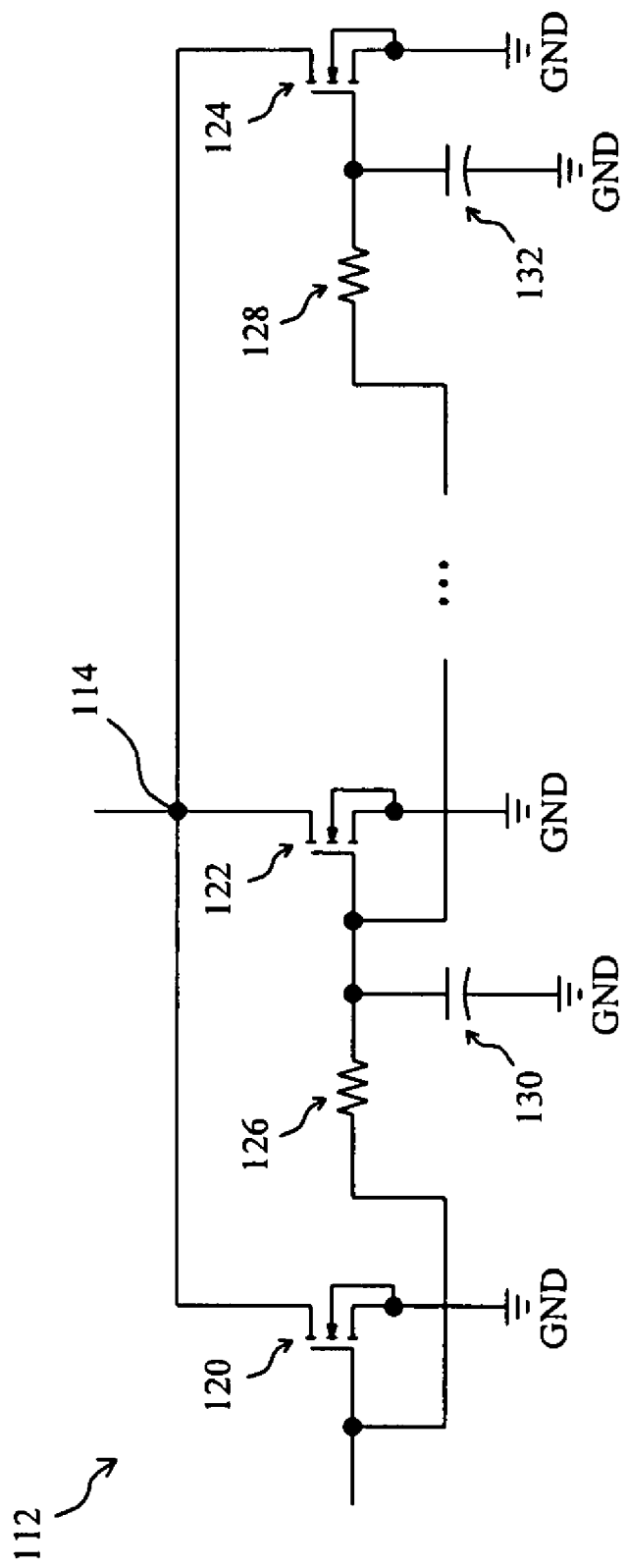
FIG. 2 shows a typical implementation of the power switch of FIG. 1.
Figure 3:
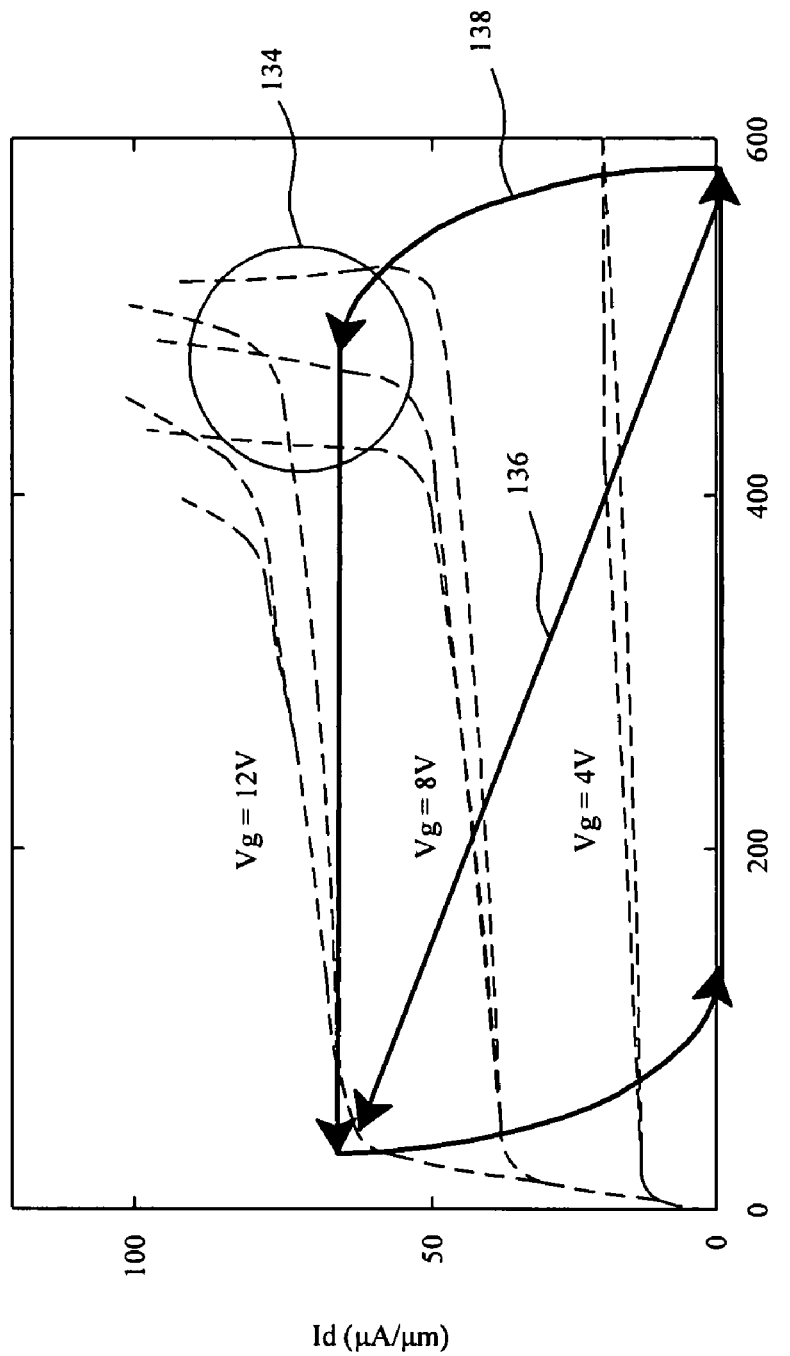
FIG. 3 shows the real and ideal I-V curves of the power switch of FIG. 1 when it is driven.
Figure 4:
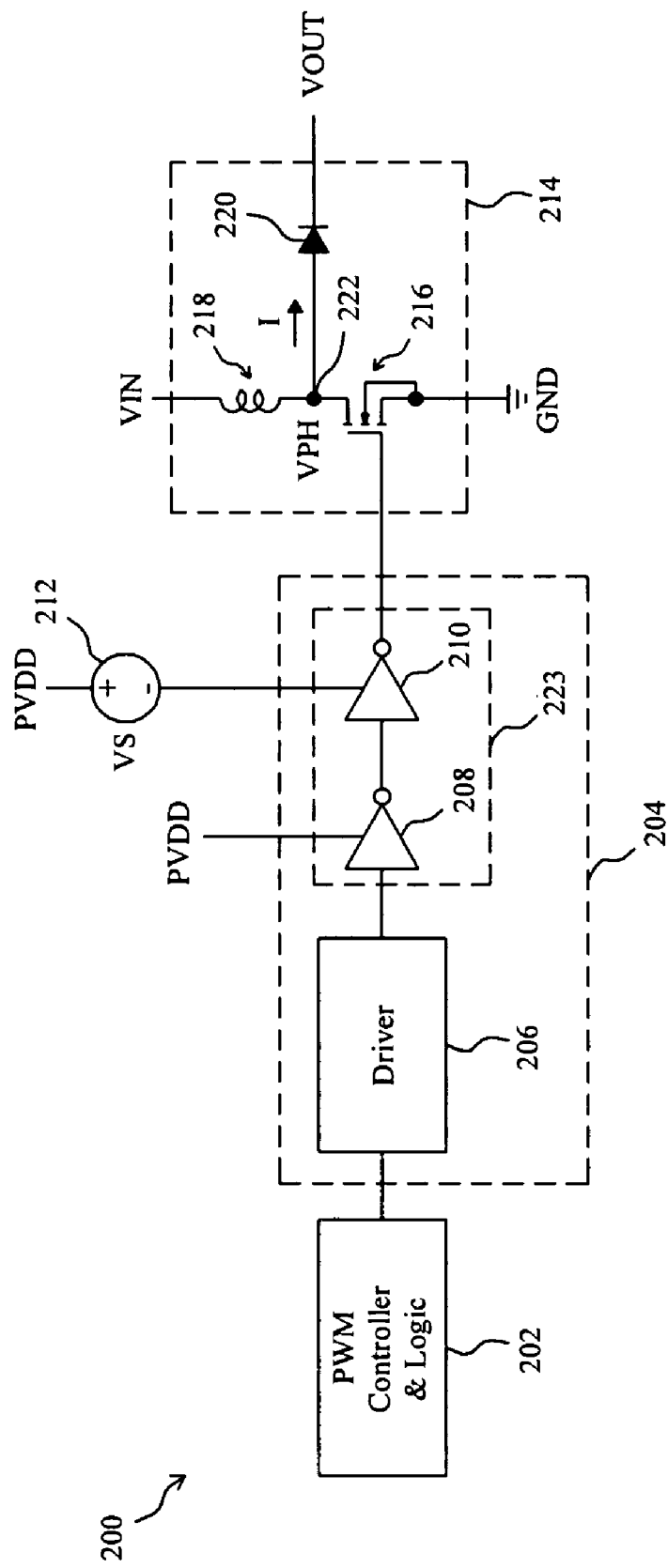
FIG. 4 shows a boost circuit according to the present invention.
Figure 5:
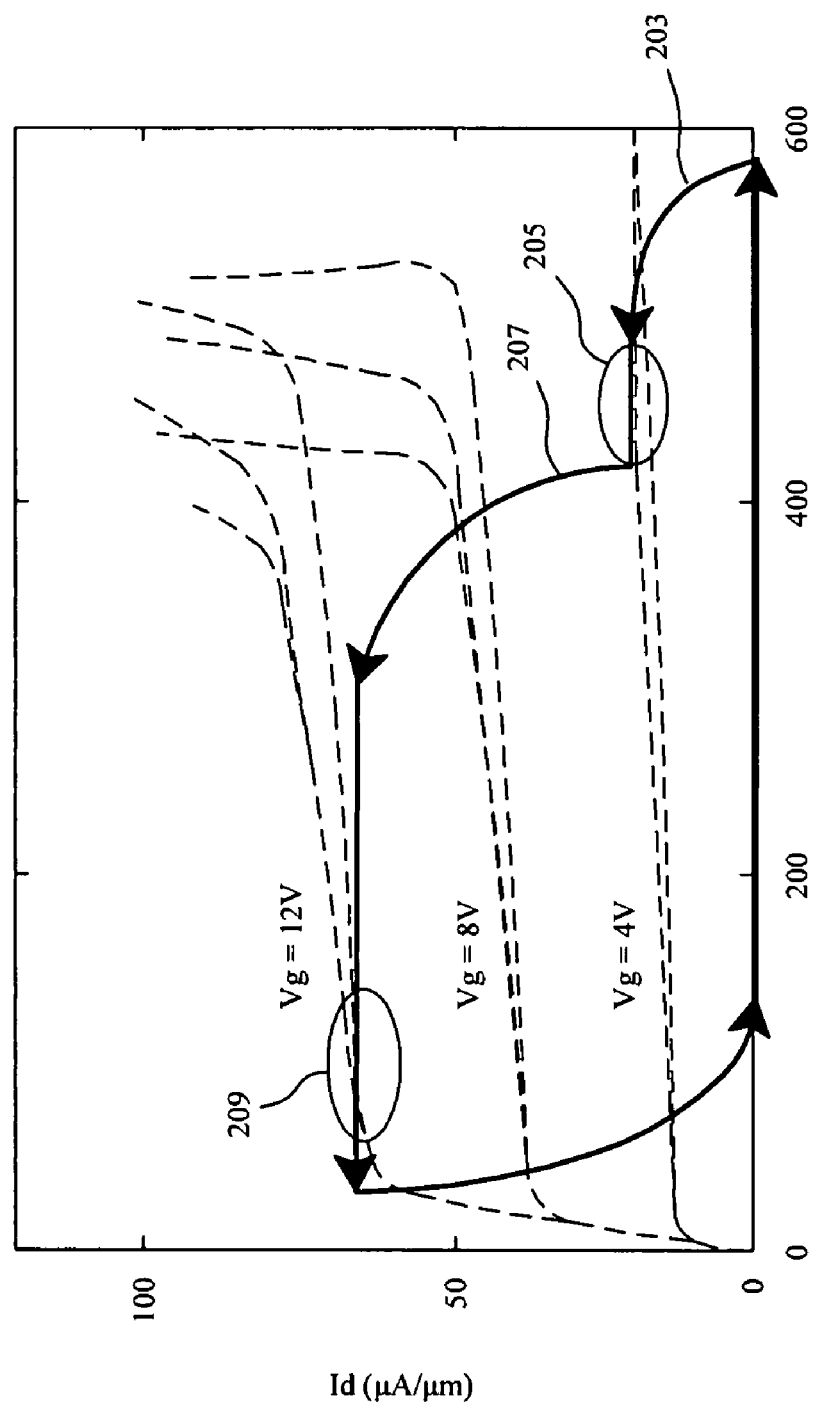
FIG. 5 shows an I-V curve of the power switch of FIG. 4 when it is driven.

FIG. 4 shows a first embodiment of power management apparatus according to the present invention. A boost circuit 200 comprises a PWM controller and logic 202 for producing a control signal, a drive circuit 204 connected to the PWM controller and logic 202 for producing a drive signal according to the control signal, a power output stage 214 connected between a power input VIN and ground GND for converting the input voltage VIN to an output voltage VOUT according to the drive signal, and an adjusting circuit 212 connected to the drive circuit 204 for adjusting the drive signal. The drive circuit 204 has a driver 206 connected to the PWM controller and logic 202 and a buffer unit 223 connected between the driver 206 and the power output stage 214. The buffer unit 223 includes inverter gates 208 and 210 coupled in series, and the inverter gate 208 is connected with an operation voltage PVDD. The power output stage 214 includes a power switch 216, an energy storage unit 218, and a rectifier circuit 220, which are all connected together by a phase node 222 with a phase voltage VPH thereon. The power switch 216 is connected between the phase node 222 and ground GND, and is alternatively turned on and off by the drive signal. The energy storage unit 218 is connected between the power input VIN and the phase node 222 to store and release energy by turning on and off the power switch 216. The rectifier circuit 220 is connected between the phase node 222 and the power output VOUT for maintaining a current I flowing from the phase node 222 to the power output VOUT. The power switch 216 includes a plurality of NMOS transistors as the configuration shown in FIG. 2. In this embodiment, the energy storage unit 218 is an inductor, the rectifier circuit 220 is a diode, and the adjusting circuit 212 is a voltage source connected between the input PVDD and the inverter gate 210 to provide a voltage VS that is function of the phase voltage VPH and is smaller than PVDD such that the drive signal provided by the drive circuit 204 for the power switch 216 has the voltage level of PVDD-VS. FIG. 5 shows an I-V curve of the power switch 216 when it is driven. Referring to FIGS. 4 and 5, in higher than PVDD, so as to increase the operational flexibility of the power switch 216, and to further reduce the ON-resistance of the power switch 216, thereby increasing the efficiency of the boost circuit 200.

Figure 6:
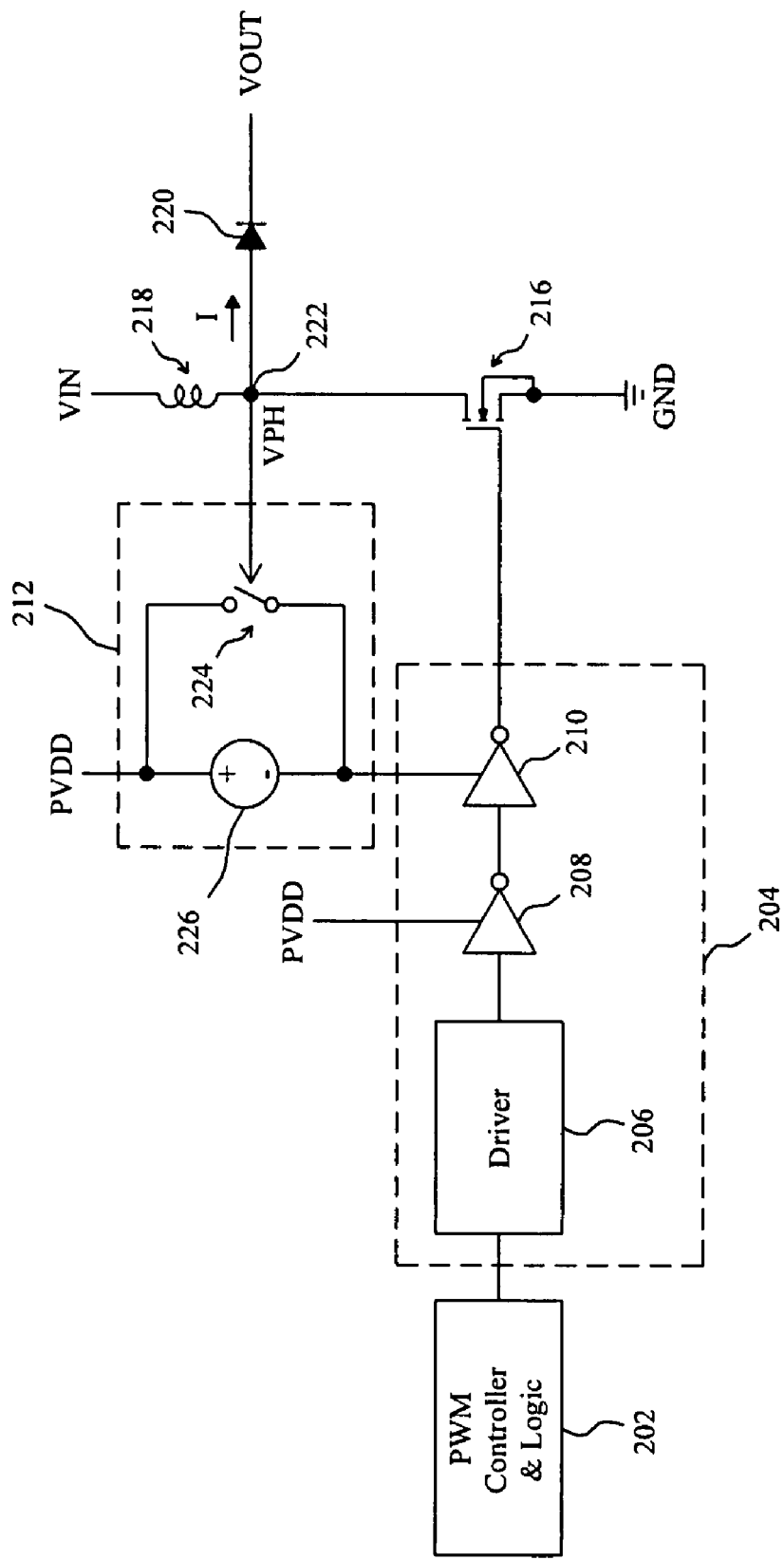
FIG. 6 shows a first embodiment for the adjusting circuit of FIG. 4.
Figure 7:
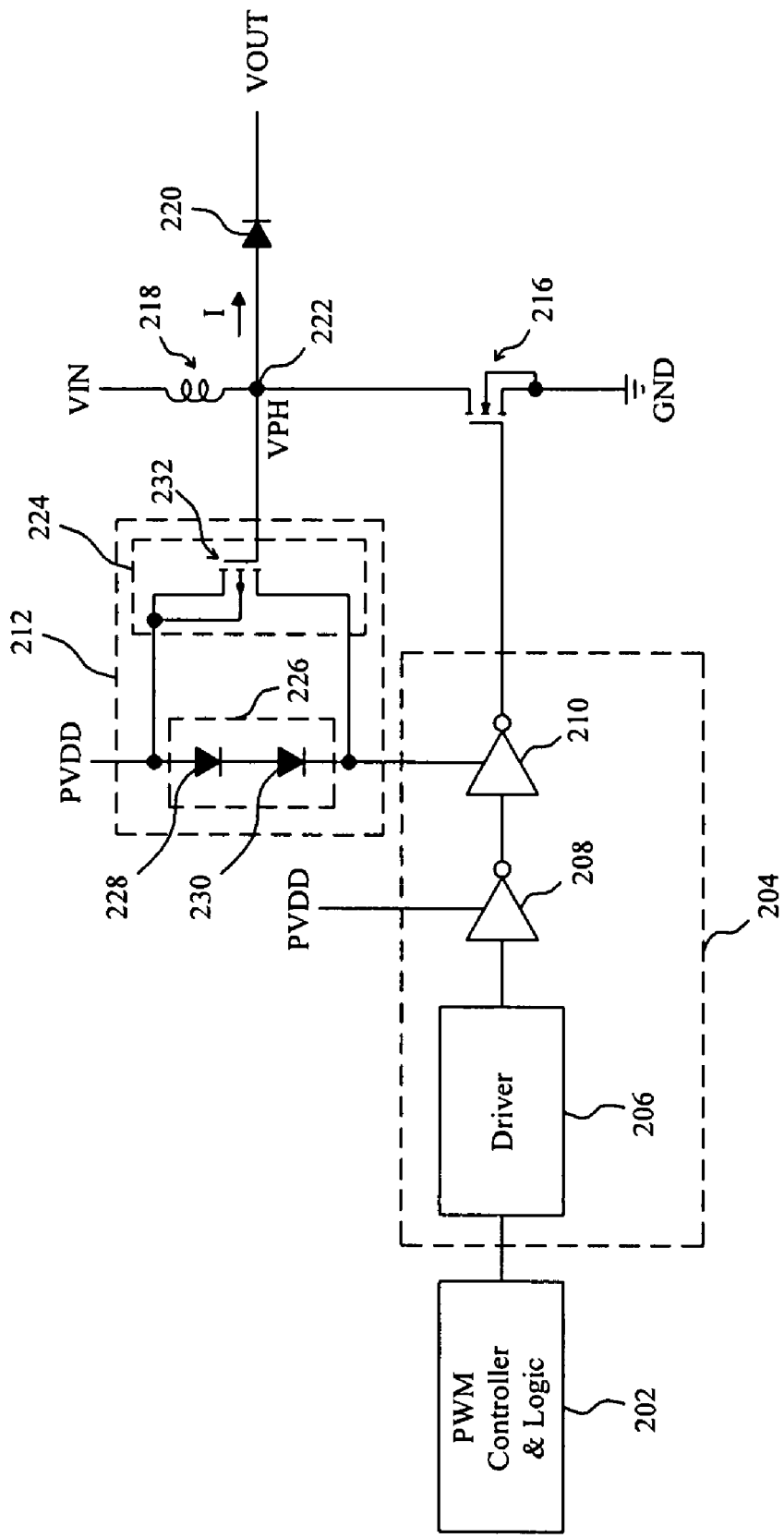
FIG. 7 shows a second embodiment for the adjusting circuit of FIG. 4.
Figure 8:
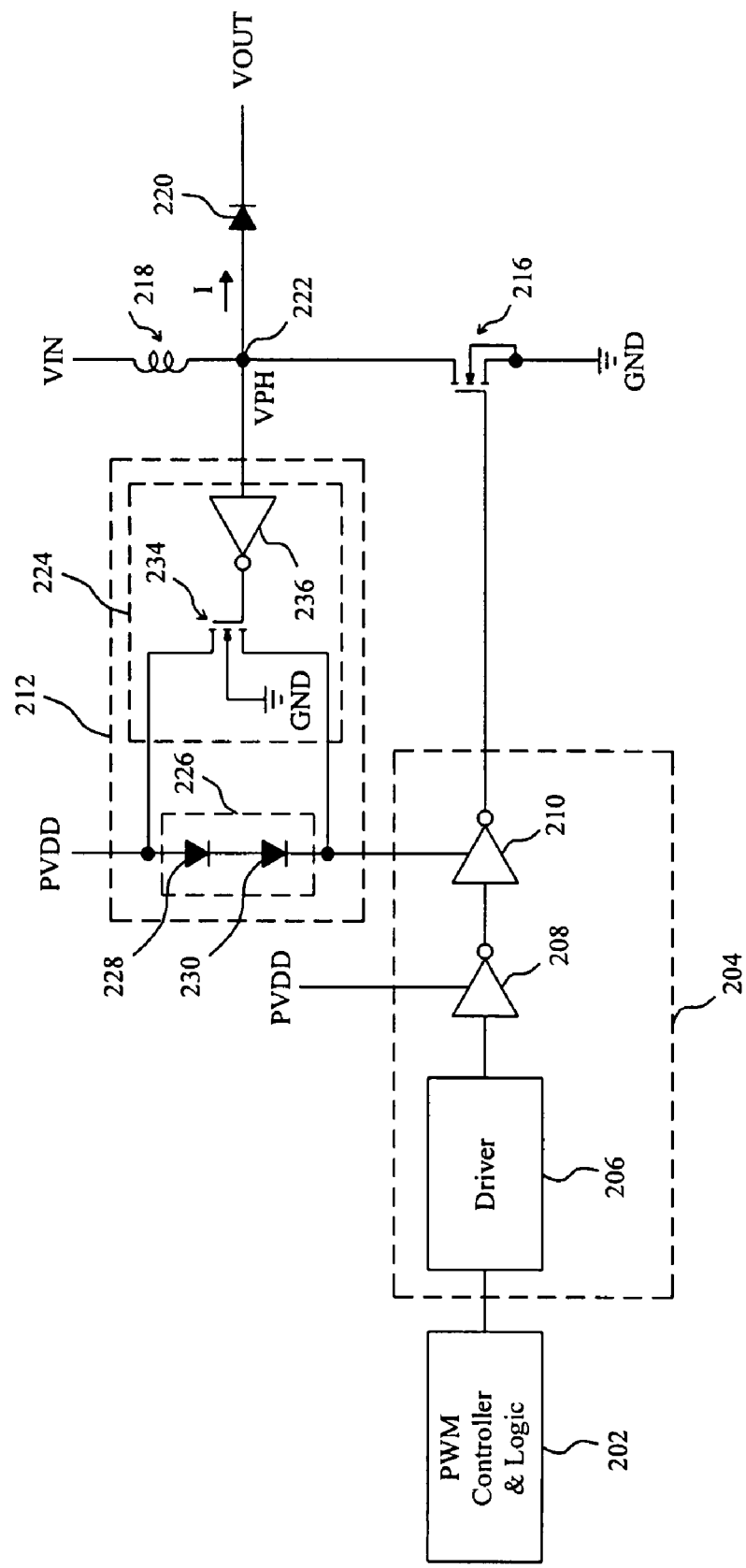
FIG. 8 shows a third embodiment for the adjusting circuit of FIG. 4.

FIG. 6 shows an embodiment for the adjusting circuit 212 of FIG. 4, in which a voltage source 226 is connected between the inverter gate 210 and the input PVDD, and a switch 224 is configured to bypass the voltage source 226 depending on the phase voltage VPH. The voltage source 226 may be a constant voltage source or a voltage source that is function of the phase voltage VPH, for producing a voltage VS smaller than PVDD. When the PWM controller and logic 202 triggers a control signal for the drive circuit 204 to produce a drive signal to drive the power switch 216, the gate bias of the power switch 216 becomes high, and the phase voltage VPH is still high at beginning, so the switch 224 is off, and hence the drive signal is pulled down to PVDD-VS, which will weakly turn on the power switch 216. Then, the phase voltage VPH goes down to low and turns on the switch 224 accordingly, thereby pulling the drive signal up to PVDD, and the ON-resistance of the power switch 216 is further reduced since it is completely turned on. By this way, the power switch 216 is prevented from non-uniform turn on and operating in high gate and drain bias condition, and is thereby away from avalanche breakdown. In one embodiment, as shown in FIG. 7, the voltage source 226 comprises serially connected diodes 228 and 230 to provide the voltage VS, and the switch 224 is a PMOS transistor 232 whose gate is connected to the phase node 222. When the phase voltage VPH is high, the PMOS transistor 232 is turned off, so the drive signal equals to PVDD-VS. When the phase voltage VPH is low, the PMOS 232 is turned on, so the drive signal is about PVDD. In different embodiments, the voltage source 226 may comprise Zener diode, NMOS transistor, PMOS transistor, bipolar junction transistor (BJT), or circuit having any one of these elements. In another embodiment, as shown in FIG. 8, the switch 224 comprises a NMOS transistor 234 whose substrate is grounded and an inverter gate 236 connected between the gate of the NMOS transistor 234 and the phase node 222. When the phase voltage VPH is high, the gate voltage of the NMOS transistor 234 is low, so the NMOS transistor 234 is off, and hence the drive signal equals to PVDD-VS. When the phase voltage VPH is low, the gate voltage of the NMOS transistor 234 is high, so the NMOS transistor 234 is on, and hence the drive signal is about PVDD.

Figure 9:
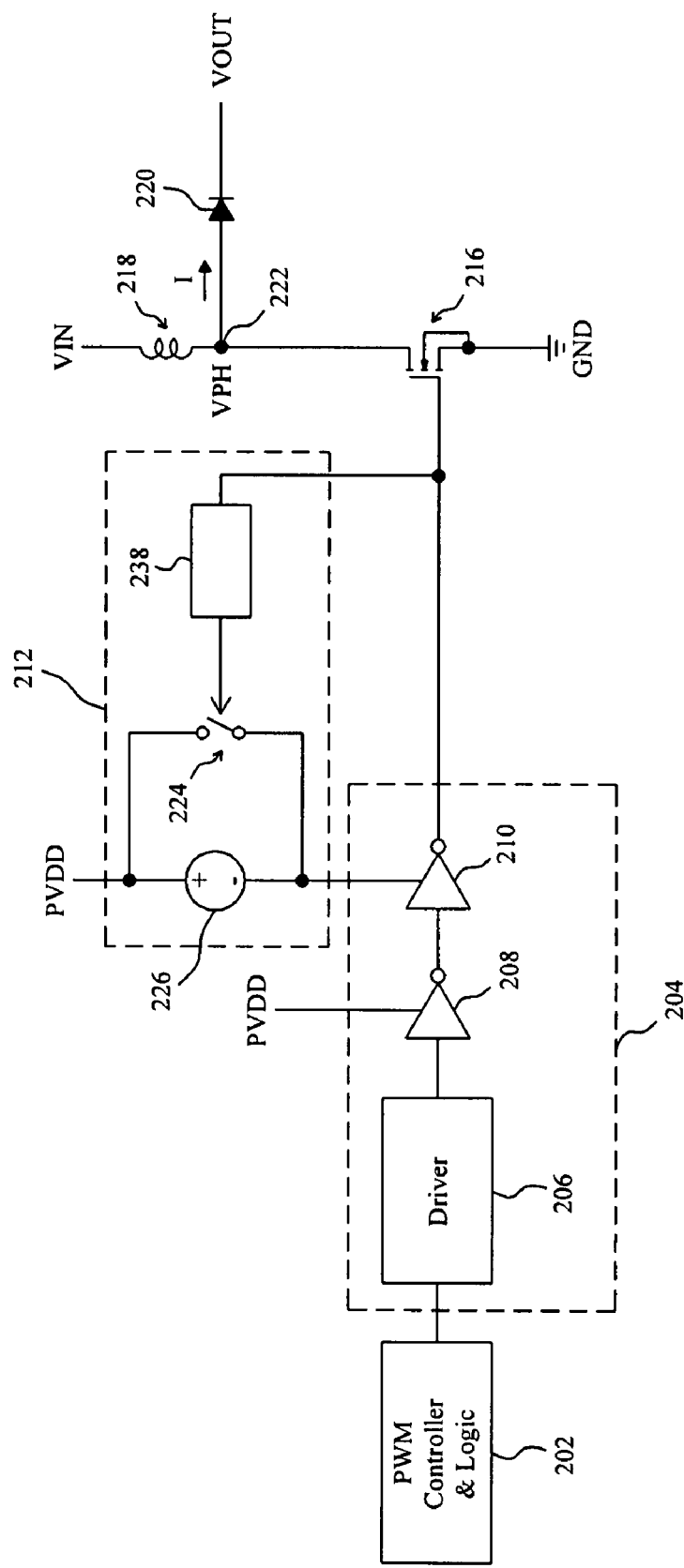
FIG. 9 shows a fourth embodiment for the adjusting circuit of FIG. 4.
Figure 10:
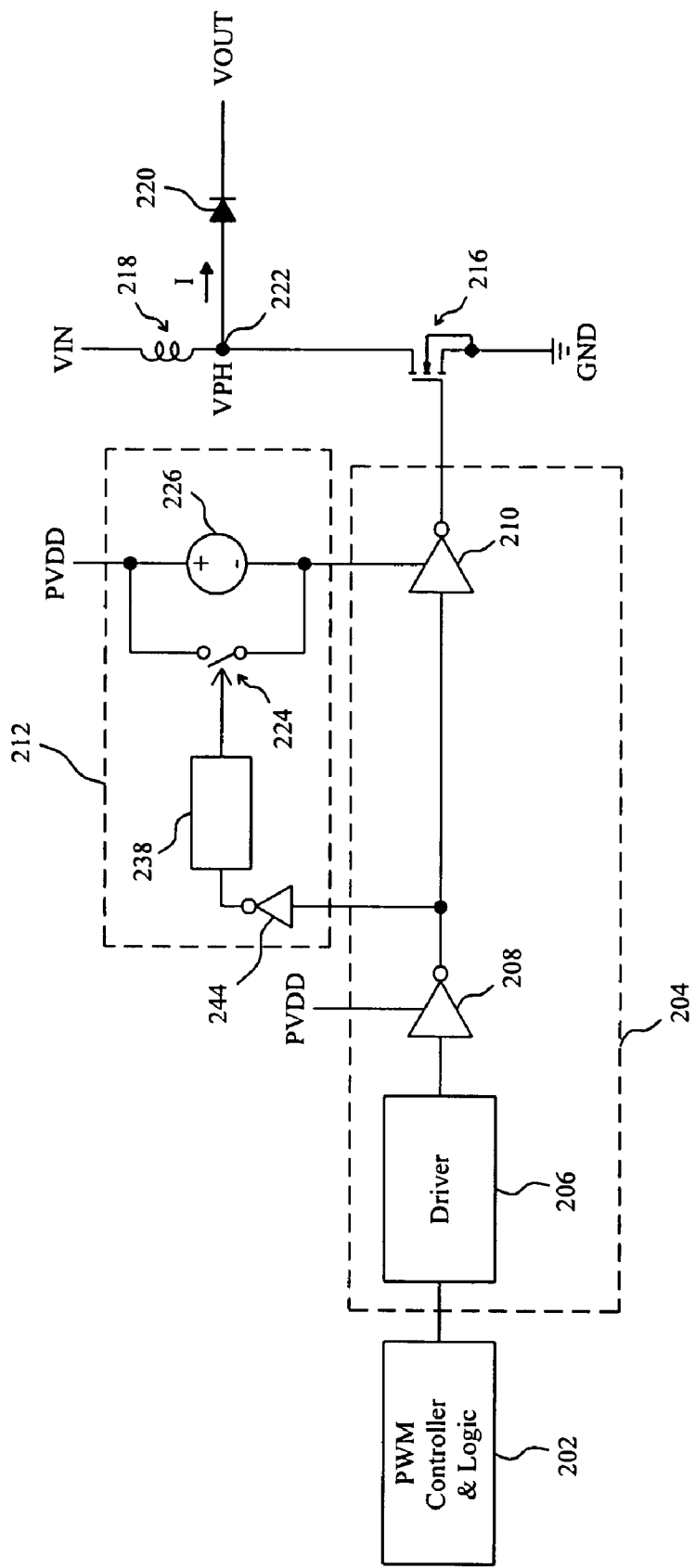
FIG. 10 shows a fifth embodiment for the adjusting circuit of FIG. 4.
Figure 11:
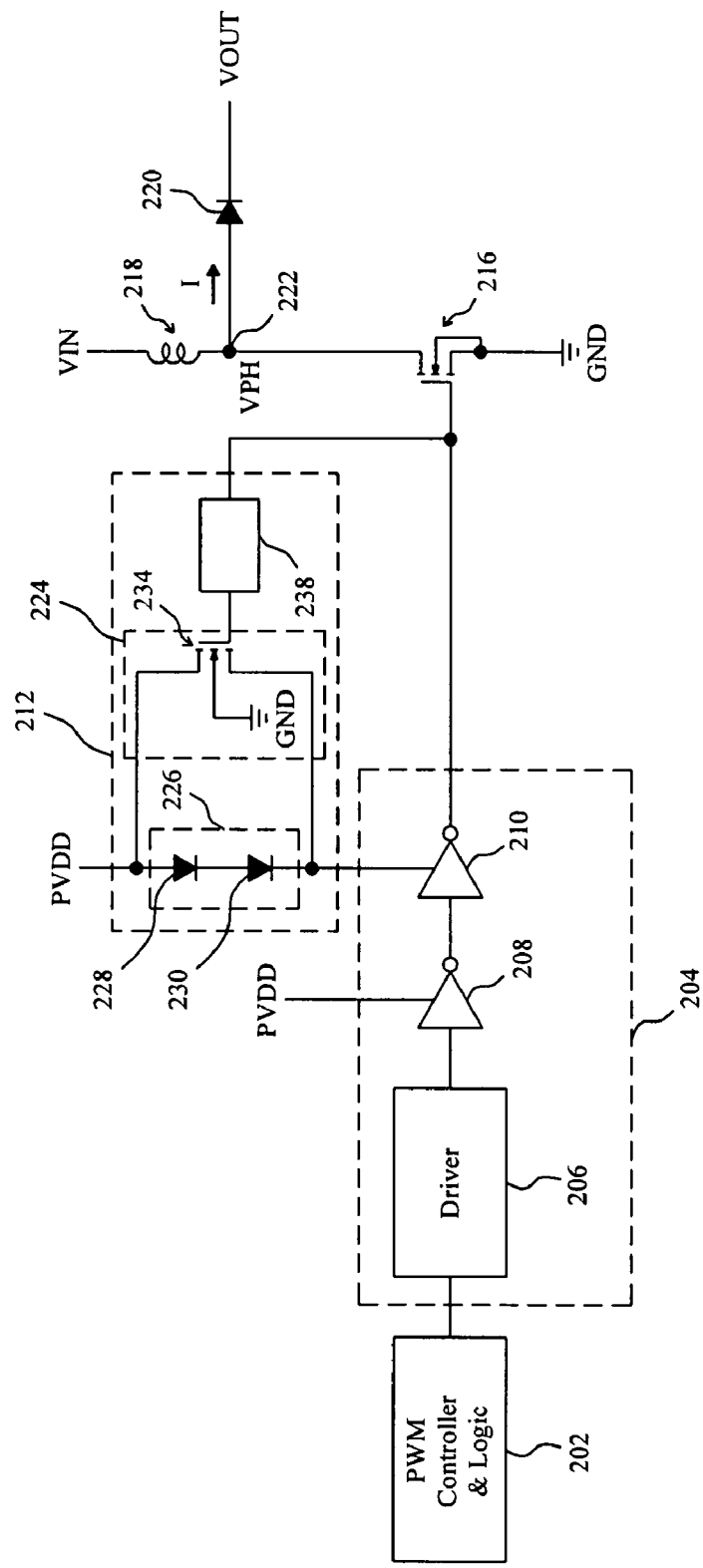
FIG. 11 shows a sixth embodiment for the adjusting circuit of FIG. 4.
Figure 12:
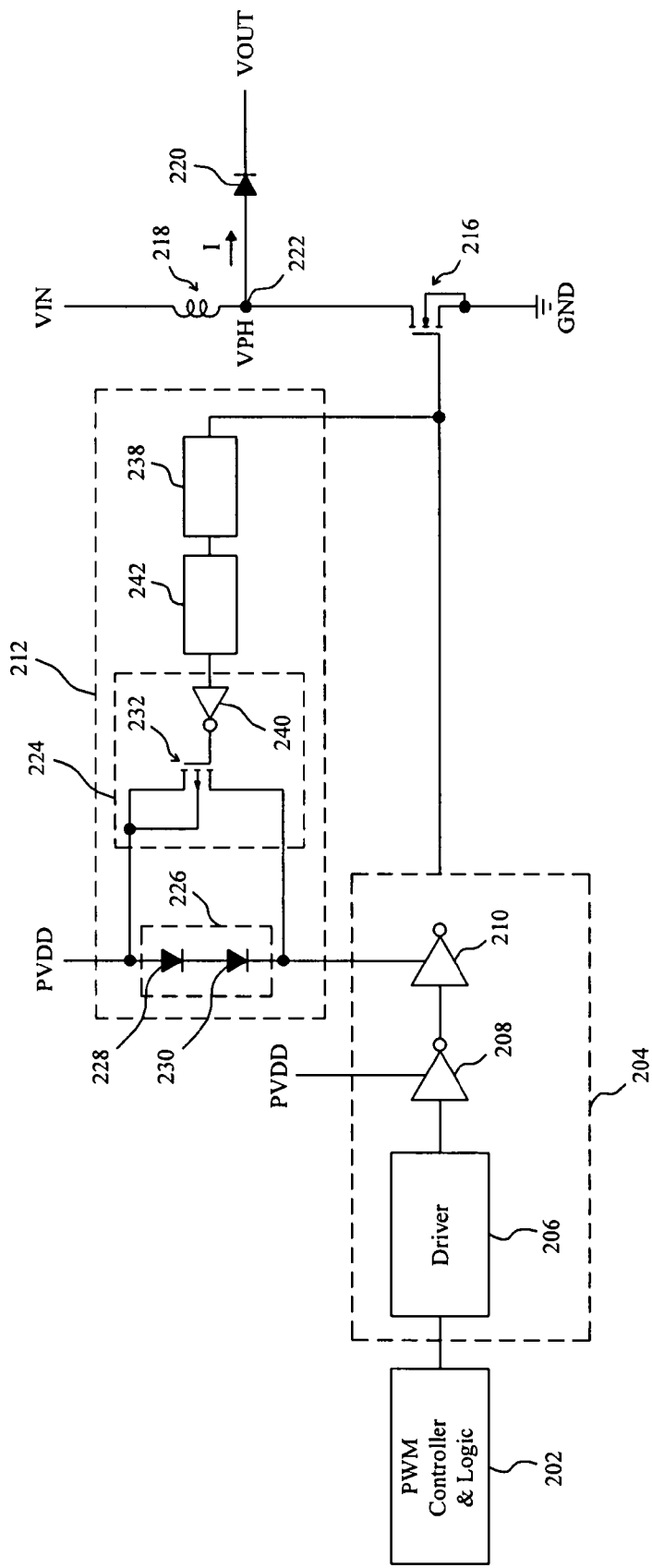
FIG. 12 shows a seventh embodiment for the adjusting circuit of FIG. 4.

FIG. 9 shows another embodiment for the adjusting circuit 212 of FIG. 4, in which a voltage source 226 is connected between the inverter gate 210 and the input PVDD for providing a voltage VS smaller than PVDD, a delay device 238 is connected with the output of the drive circuit 204 for producing a delay signal, and a switch 224 is configured to bypass the voltage source 226 depending on the delay signal. The voltage source 226 is a constant voltage source or a voltage source that is function of the phase voltage VPH. With the delay device 238, the switch 224 will be short after a period of delay time when the gate voltage of the power switch 216 goes high. When the switch 224 is off, the gate voltage of the power switch 216 is pulled down to PVDD-VS to weakly turn on the power switch 216 and then, after the period of delay time, the gate voltage of the power switch 216 is pulled up to PVDD since the switch 224 is on. As a result, the power switch 216 is avoided to operate at highest gate and drain voltages simultaneously even a non-uniform turn on happens, and is thereby away from avalanche breakdown. In one embodiment, as shown in FIG. 10, the delay device 238 produces the delay signal from a signal in the drive circuit 204, for example the output of the inverter gate 208 inverted by the inverter gate 244, to drive the switch 224. In another embodiment, as shown in FIG. 11, the voltage source 226 comprises serially connected diodes 228 and 230 to produce a voltage VS, and the switch 224 includes a NMOS transistor 234 having its substrate grounded and gate connected to the delay device 238. At beginning, the NMOS transistor 234 is off, the gate voltage of the power switch 216 is pulled down to PVDD-VS, and the power switch 216 is weakly turned on. Then, after a period of delay time, the NMOS transistor 234 is turned on by the delay signal, so the drive signal becomes about PVDD, and the power switch 216 goes into a low ON-resistance region. In different embodiments, the voltage source 226 may comprise Zener diode, NMOS transistor, PMOS transistor, BJT, or circuit having any one of these elements. In yet another embodiment, as shown in FIG. 12, the switch 224 comprises a PMOS transistor 232 and an inverter gate 240 connected between the gate of the PMOS transistor 232 and the delay device 238. At beginning, the PMOS transistor 232 is off, the gate voltage of the power switch 216 is pulled down to PVDD-VS, and the power switch 216 is weakly turned on. Then, after a period of delay time, the PMOS transistor 232 is turned on by the delay signal, so the gate voltage of the power switch 216 is pulled up to PVDD, and the power switch 216 goes into a low ON-resistance region. Preferably, a level shift circuit 242 is connected between the inverter gate 240 and the delay device 238, so as to ensure that the delay signal produced by the delay device 238 is level shifted to be enough to drive the inverter gate 240.

Figure 13:
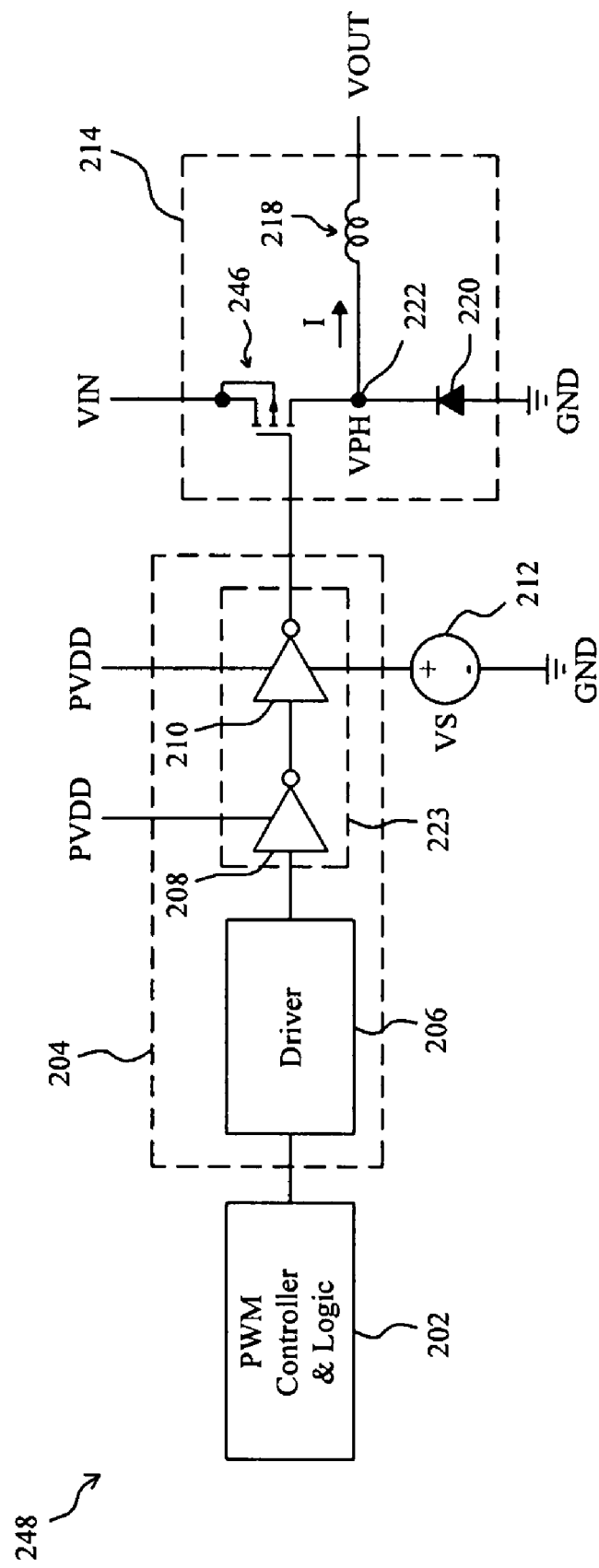
FIG. 13 shows a buck circuit according to the present invention.

FIG. 13 shows a second embodiment of power management apparatus according to the present invention. A buck circuit 248 comprises a PWM controller and logic 202 for producing a control signal, a drive circuit 204 connected to the PWM controller and logic 202 for producing a drive signal according to the control signal, a power output stage 214 connected between a power input VIN and ground GND for converting the input voltage VIN to an output voltage VOUT according to the drive signal, and an adjusting circuit 212 connected to the drive circuit 204 for adjusting the drive signal. The drive circuit 204 includes a driver 206 connected to the PWM controller and logic 202 and a buffer unit 223 connected between the driver 206 and the power output stage 214. The buffer unit 223 includes inverter gates 208 and 210 coupled in series and connected with an operation voltage PVDD. The power output stage 214 includes a power switch 246 connected between a phase node 222 and the power input VIN, and is alternatively turned on and off by the drive signal, an energy storage unit 218 connected between the phase node 222 and the power output VOUT to store and release energy by turning on and off the power switch 246, and a rectifier circuit 220 connected between the phase node 222 and ground GND. The power switch 246 includes a plurality of PMOS transistors in such a manner that all their drains connected to the phase node 222, all their sources connected to the power input VIN, and all their gates connected together, such that the configuration can be regarded as an equivalent PMOS switch. In this embodiment, the energy storage unit 218 is an inductor, the rectifier circuit 220 is a diode, and the adjusting circuit 212 is a voltage source connected between the inverter gate 210 and ground GND to provide a voltage VS that is a function of the phase voltage VPH and is smaller than the operation voltage PVDD. When the PWM controller and logic 202 triggers a control signal for the drive circuit 204 to produce a drive signal to drive the power switch 246, the gate bias of the power switch 246 goes low, while the phase voltage VPH is still low at beginning, the adjusting circuit 212 produces a voltage VS smaller than the operation voltage PVDD such that the gate voltage of the power switch 246 goes down to VS first, and thus the power switch 246 is weakly turned on to prevent the power switch 246 from avalanche breakdown. Then, the phase voltage VPH goes high, so the voltage VS decreases to approach zero, the gate voltage of the power switch 246 is pulled down to approach zero, and hence the power switch 246 is completely turned on. By this way, the power switch 246 will be away from avalanche breakdown at the initial of switch turn on and goes into low ON-resistance state to improve the efficiency of the buck circuit 248 later.

Figure 14:
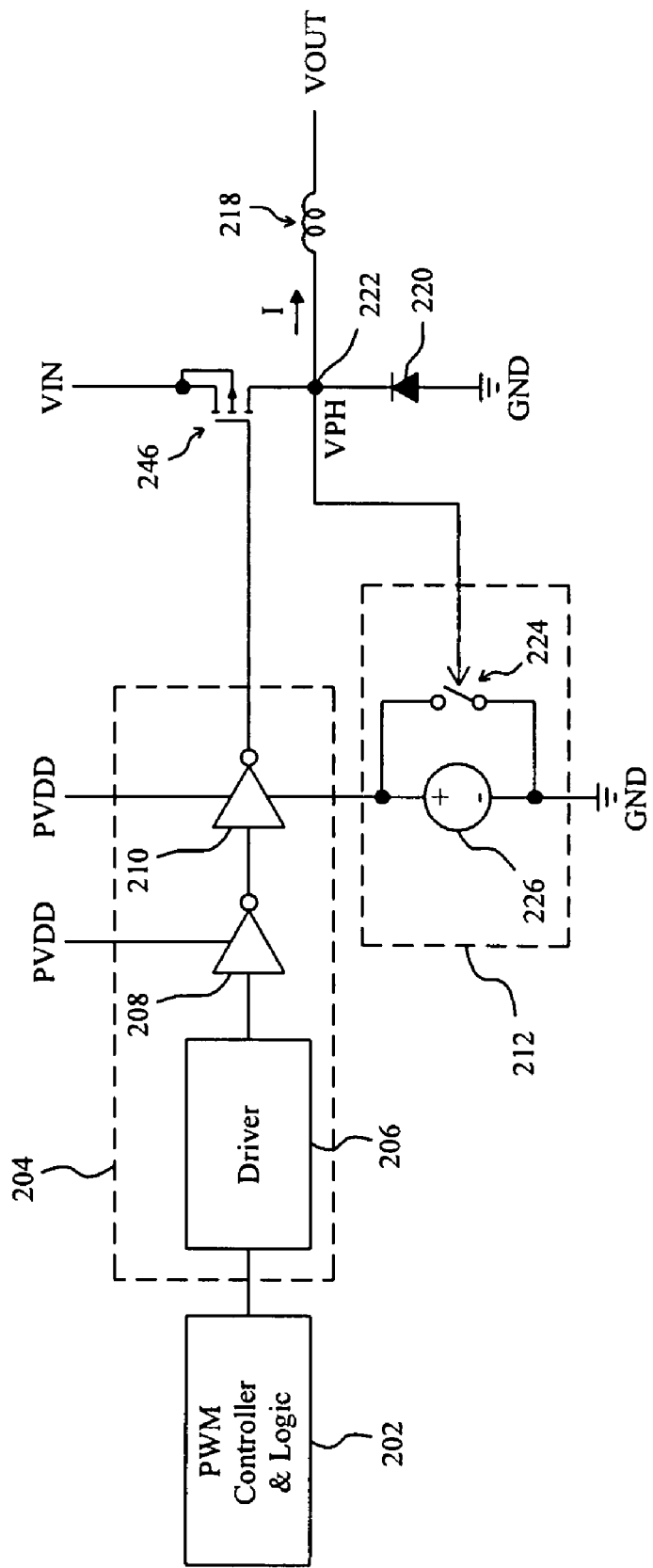
FIG. 14 shows a first embodiment for the adjusting circuit of FIG. 13.

FIG. 14 shows an embodiment for the adjusting circuit 212 of FIG. 13, in which a voltage source 226 is connected between the inverter gate 210 and ground GND, and may be a constant voltage source or a voltage source that is function of the phase voltage VPH, for producing a voltage VS smaller than PVDD, and a switch 224 is configured to bypass the voltage source 226 depending on the phase voltage VPH. When the PWM controller and logic 202 triggers a control signal for the drive circuit 204 to produce a drive signal to drive the power switch 246, if the phase voltage VPH is still low, the switch 224 will be turned off by the phase voltage VPH, and thus the gate voltage of the power switch 246 will go VS first to weakly turn on the power switch 246. Then the phase voltage VPH goes high, so the switch 224 is turned off by the phase voltage VPH, the gate voltage of the power switch 246 is pulled down to approach zero, thereby reducing the ON-resistance of the power switch 246. By this way, the power switch 246 is avoided to operate at highest gate and drain voltages simultaneously even a non-uniform turn on happens, and is thereby away from avalanche breakdown. In different embodiments, the voltage source 226 may comprise diode, Zener diode, NMOS transistor, PMOS transistor, BJT, or circuit having any one of these elements.

Figure 15:
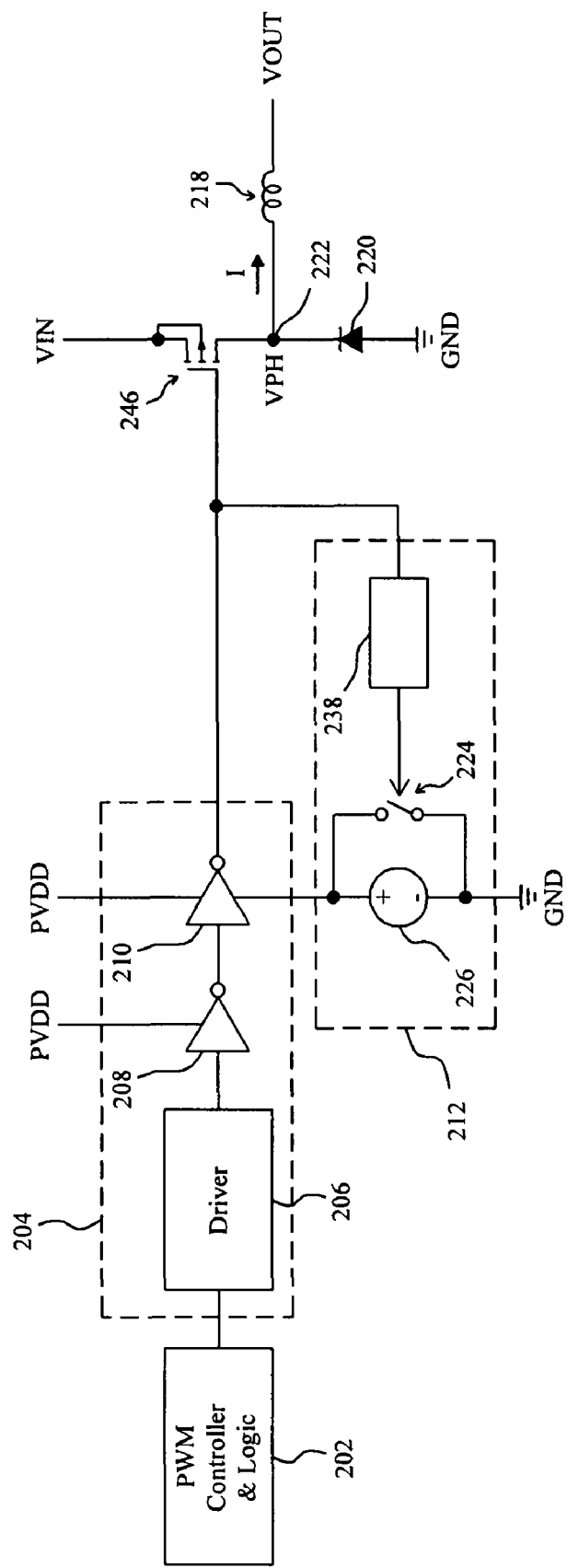
FIG. 15 shows a second embodiment for the adjusting circuit of FIG. 13.

FIG. 15 shows another embodiment for the adjusting circuit 212 of FIG. 13, in which a voltage source 226 is connected between the inverter gate 210 and ground GND, and may be a constant voltage source or a voltage source that is function of the phase voltage VPH, for producing a voltage VS smaller than PVDD, a delay device 238 is connected to the output of the drive circuit 204 for producing a delay signal, and a switch 224 is configured to bypass the voltage source 226 depending on the phase voltage VPH. When the gate voltage of the power switch 246 goes low, the gate voltage of the power switch 246 will be pulled down to VS first to weakly turn on the power switch 246. Then, after a period of delay time, the switch 224 is short, and the gate voltage of the power switch 246 goes down to zero to completely turn on the power switch 246. Thus, the power switch 246 is avoided to operate at highest gate and drain voltages simultaneously even a non-uniform turn on happens, and is thereby away from avalanche breakdown. In different embodiments, the delay device 238 may produces the delay signal from a signal in the drive circuit 204, the voltage source 226 may comprise diode, Zener diode, NMOS transistor, PMOS transistor, BJT, or circuit having any one of these elements, and the switch 224 may comprise PMOS transistor, NMOS transistor, or circuit having any one of these elements.

Figure 16:
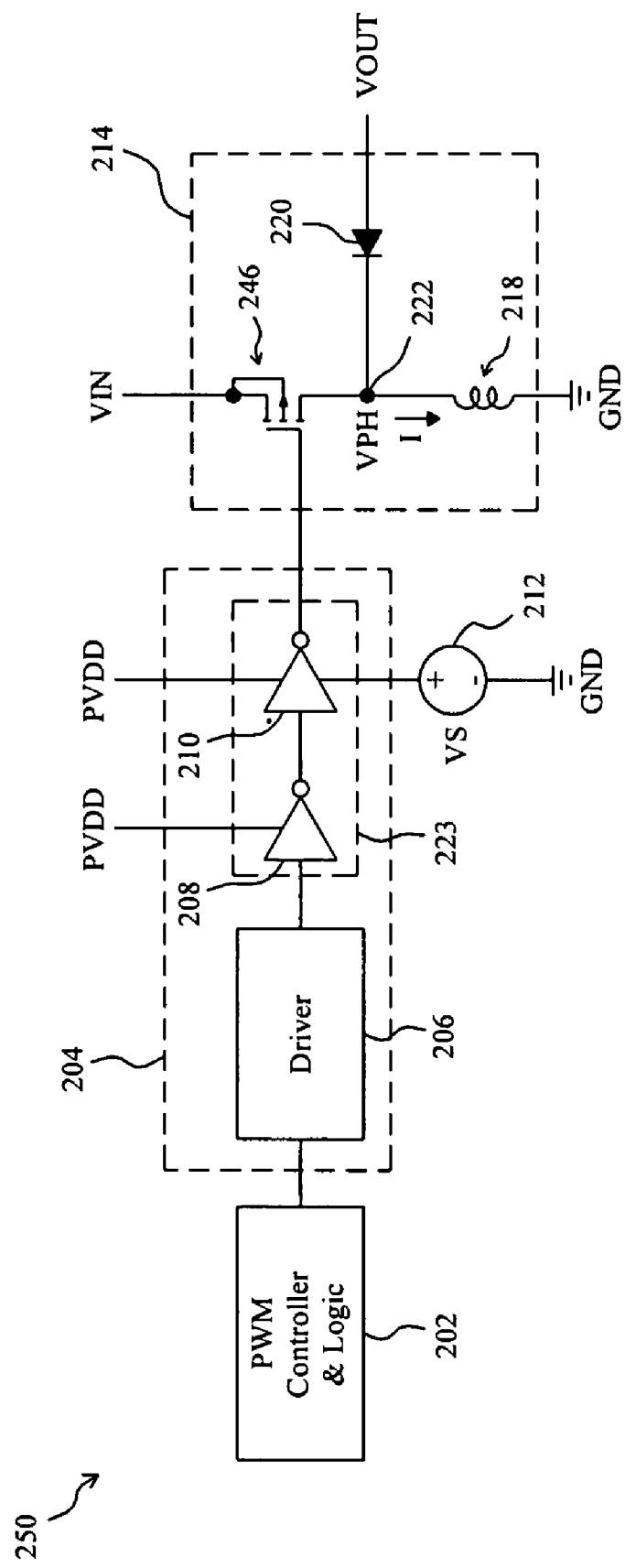
FIG. 16 shows an inverter circuit according to the present invention.

FIG. 16 shows a third embodiment of power management apparatus according to the present invention. An inverter circuit 250 comprises a PWM controller and logic 202 for producing a control signal, a drive circuit 204 connected to the PWM controller and logic 202 for producing a drive signal according to the control signal, a power output stage 214 connected between a power input VIN and ground GND for converting the input voltage VIN to an output voltage VOUT according to the drive signal, and an adjusting circuit 212 connected to the drive circuit 204 for adjusting the drive signal. The drive circuit 204 includes a driver 206 connected to the PWM controller and logic 202 and a buffer unit 223 connected between the driver 206 and the power output stage 214. The buffer unit 223 includes inverter gates 208 and 210 coupled in series and connected with an operation voltage PVDD. The power output stage 214 includes a power switch 246 connected between a phase node 222 and the power input VIN, and is alternatively turned on and off by the drive signal, an energy storage unit 218 connected between the phase node 222 and ground GND to store and release energy by turning on and off the power switch 246, and a rectifier circuit 220 connected between the phase node 222 and the power output VOUT. The power switch 246 includes a plurality of PMOS transistors in such a manner that all their drains connected to the phase node 222, all their sources connected to the power input VIN, and all their gates connected together, such that the configuration can be regarded as an equivalent PMOS switch. In this embodiment, the energy storage unit 218 is an inductor, the rectifier circuit 220 is a diode, and the adjusting circuit 212 is a voltage source connected between the inverter gate 210 and ground GND to provide a voltage VS that is function of the phase voltage VPH and is smaller than PVDD. When the PWM controller and logic 202 triggers a control signal for the drive circuit 204 to produce a drive signal to drive the power switch 246, the gate voltage of the power switch 246 goes low, while the phase voltage VPH is still low, the gate voltage of the power switch 246 goes down to VS first, and thus the power switch 246 is weakly turned on, which avoids the power switch 246 to avalanche breakdown. Then, the phase voltage VPH goes high, so the voltage VS decreases to approach zero, the gate voltage of the power switch 246 is pulled down to approach zero, and hence the power switch 246 goes into a low ON-resistance region. By this way, the power switch 246 is prevented from avalanche breakdown when it is turning on, and the efficiency of the inverter circuit 250 is also improved.

Figure 17:
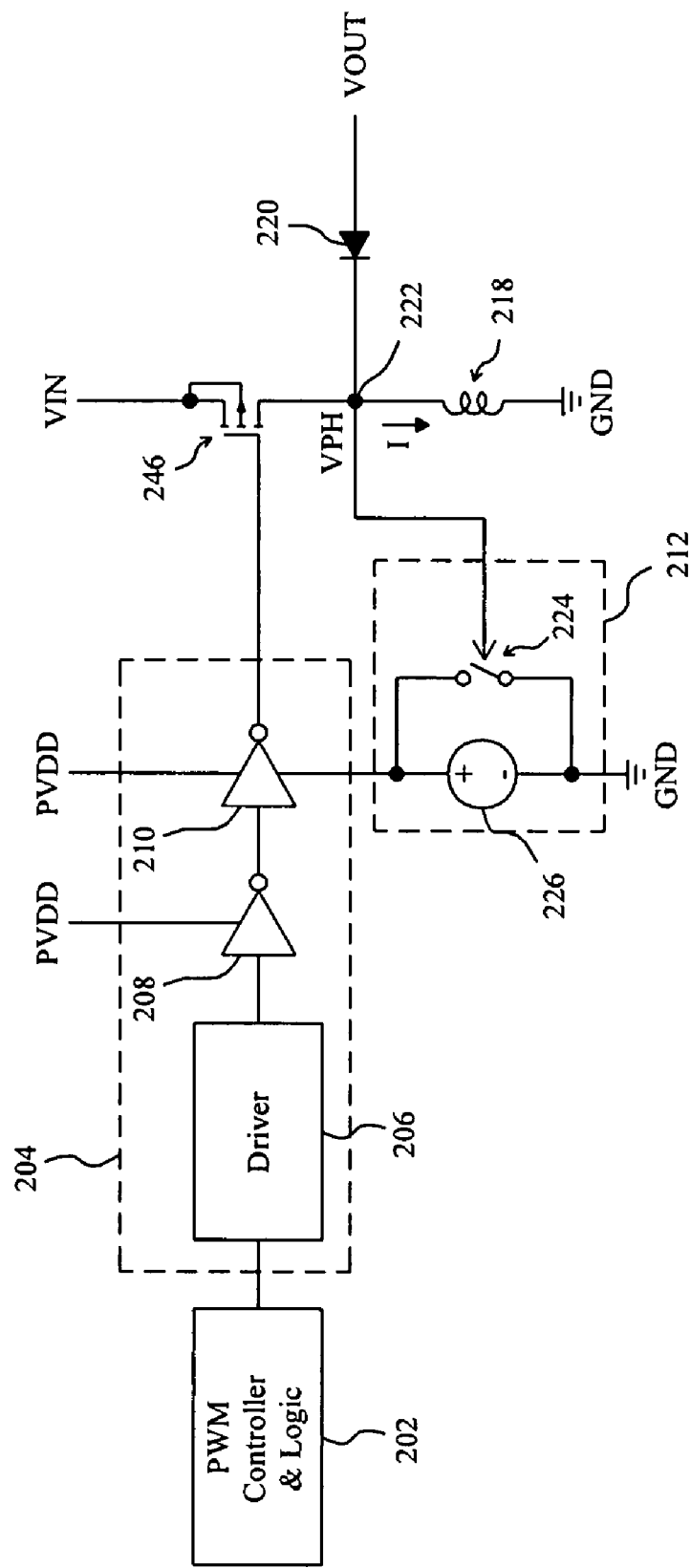
FIG. 17 shows a first embodiment for the adjusting circuit of FIG. 16.

FIG. 17 shows an embodiment for the adjusting circuit 212 of FIG. 16, in which a voltage source 226 is connected between the inverter gate 210 and ground GND, and may comprise a constant voltage source or a voltage source that is function of the phase voltage VPH, for producing a voltage VS smaller than PVDD, and a switch 224 is configured to bypass the voltage source 226 depending on the phase voltage VPH. When the PWM controller and logic 202 triggers a control signal for the drive circuit 204 to produce a drive signal to drive the power switch 246, if the phase voltage VPH is still low, the switch 224 will be open due to the phase voltage VPH, and the gate voltage of the power switch 246 will go down to VS first to weakly turn on the power switch 246. After the phase voltage VPH goes high, the switch 224 is short to bypass the voltage source 226, the gate voltage of the power switch 246 is pulled down to approach zero to completely turn on the power switch 246. By this way, the power switch 246 is avoided to operate at highest gate and drain voltages simultaneously even a non-uniform turn on happens, and is thereby away from avalanche breakdown. In different embodiments, the voltage source 226 may comprise diode, Zener diode, NMOS transistor, PMOS transistor, BJT, or circuit having any one of these elements, and the switch 224 may comprise PMOS transistor, NMOS transistor, or circuit having any one of these elements.

Figure 18:
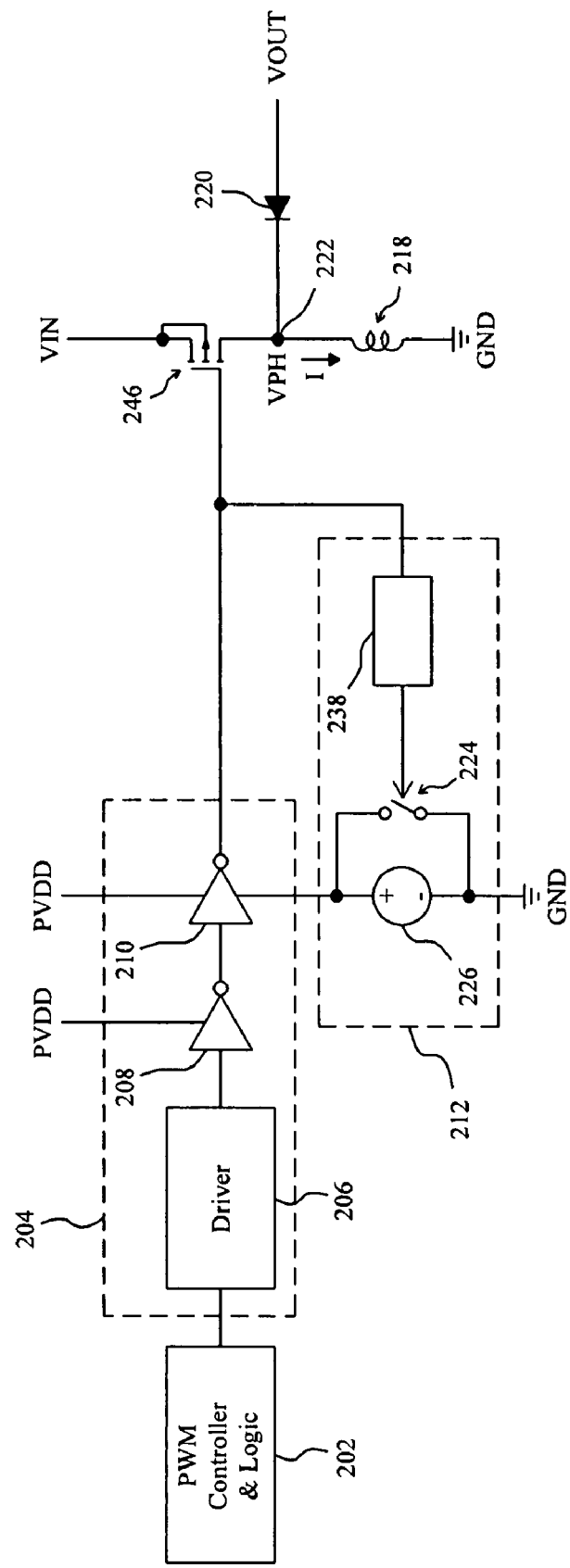
FIG. 18 shows a second embodiment for the adjusting circuit of FIG. 16.

FIG. 18 shows another embodiment for the adjusting circuit 212 of FIG. 16, in which a voltage source 226 is connected between the inverter gate 210 and ground GND, and may comprise a constant voltage source or a voltage source that is function of the phase voltage VPH, for producing a voltage VS smaller than PVDD, a delay device 238 is connected to the output of the drive circuit 204 for producing a delay signal, and a switch 224 is configured to bypass the voltage source 226 depending on the delay signal. When the gate voltage of the power switch 246 initially goes low, due to the delay device 238, the switch 224 will be short after a period of delay time, and hence the gate voltage of the power switch 246 goes down to VS first, and is pulled down to approach zero after the period of delay time. By this way, the power switch 246 is avoided to operate at highest gate and drain voltages simultaneously even a non-uniform turn on happens, and is thereby away from avalanche breakdown. In different embodiments, the delay device 238 may produce the delay signal from a signal in the drive circuit 204, the voltage source 226 may comprise diode, Zener diode, NMOS transistor, PMOS transistor, BJT, or circuit having any one of these elements, and the switch 224 may comprise PMOS transistor, NMOS transistor, or circuit having any one of these elements.

The above-mentioned embodiments are designed for asynchronous power management apparatus. However, those skilled in the art should understand that those embodiments could be modified to apply for synchronous power management apparatus.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A power management apparatus comprising:
   a PWM controller and logic for producing a control signal;
   a drive circuit connected to the PWM controller and logic for producing a drive signal according to the control signal;
   a power output stage having a phase node with a phase voltage thereon, for producing an output voltage according to the drive signal; and
   an adjusting circuit connected to the drive circuit for adjusting the drive signal according to the phase voltage such that a power switch in the power output stage is weakly turned on first, the adjusting circuit including:
      voltage source to provide a voltage smaller than the operation voltage; and
      a switch configured to bypass the voltage source depending on the phase voltage.

2. The power management apparatus of claim 1, wherein the a voltage source is connected between the drive circuit and an operation voltage source to provide a voltage that is a function of the phase voltage.

3. The power management apparatus of claim 1, wherein the voltage source comprises a diode, a Zener diode, a NMOS transistor, a PMOS transistor, a BJT, or a circuit having any one of these elements.

4. The power management apparatus of claim 1, wherein the switch comprises a PMOS transistor having a gate connected to the phase node.

5. The power management apparatus of claim 1, wherein the switch comprises:
   a NMOS transistor having a grounded substrate; and
   an inverter gate connected between a gate of the NMOS transistor and the phase node.

6. A power management apparatus comprising:
   a PWM controller and logic for producing a control signal;
      a drive circuit connected to the PWM controller and logic for producing a drive signal according to the control signal;
      a power output stage having a phase node with a phase voltage thereon, for producing an output voltage according to the drive signal; and
   an adjusting circuit connected to the drive circuit for adjusting the drive signal according to the phase voltage such that a power switch in the power output stage is weakly turned on first, the adjusting circuit including:
      a voltage source connected between the drive circuit and an operation voltage source to provide a voltage smaller than the operation voltage;
      a delay device for producing a delay signal from an output of the drive circuit or a signal in the drive circuit; and
      a switch configured to bypass the voltage source depending on the delay signal.

7. The power management apparatus of claim 6, wherein the voltage source comprises a diode, a Zener diode, a NMOS transistor, a PMOS transistor, a BJT, or a circuit having any one of these elements.

8. The power management apparatus of claim 6, wherein the switch comprises a NMOS transistor having a grounded substrate and a gate connected with the delay signal.

9. The power management apparatus of claim 6, wherein the switch comprises:
   a PMOS transistor; and
   an inverter gate connected between a gate of the PMOS transistor and the delay device.

10. The power management apparatus of claim 9, wherein the switch further comprises a level shift circuit connected between the inverter gate and the delay device.

11. The power management apparatus of claim 1, wherein the adjusting circuit comprises a voltage source connected between the drive circuit and ground to provide a voltage that is a function of the phase voltage and is smaller than an operation voltage.

12. A power management apparatus comprising:
   a PWM controller and logic for producing a control signal;
      a drive circuit connected to the PWM controller and logic for producing a drive signal according to the control signal;
      a power output stage having a phase node with a phase voltage thereon, for producing an output voltage according to the drive signal; and
   an adjusting circuit connected to the drive circuit for adjusting the drive signal according to the phase voltage such that a power switch in the power output stage is weakly turned on first, the adjusting circuit including:
      a voltage source connected between the drive circuit and ground to provide a voltage smaller than an operation voltage; and
      a switch configured to bypass the voltage source depending on the phase voltage.

13. The power management apparatus of claim 12, wherein the voltage source comprises a diode, a Zener diode, a NMOS transistor, a PMOS transistor, a BJT, or a circuit having any one of these elements.

14. The power management apparatus of claim 12, wherein the switch comprises a PMOS transistor, a NMOS transistor, or a circuit having any one of these elements.

15. The power management apparatus of claim 1, wherein the adjusting circuit comprises:
   a voltage source connected between the drive circuit and ground to provide a voltage smaller than an operation voltage;
   a delay device for producing a delay signal from an output of the drive circuit or a signal in the drive circuit; and
   a switch configured to bypass the voltage source depending on the delay signal.

16. The power management apparatus of claim 15, wherein the voltage source comprises a diode, a Zener diode, a NMOS transistor, a PMOS transistor, a BJT, or a circuit having any one of these elements.

17. The power management apparatus of claim 15, wherein the switch comprises a PMOS transistor, a NMOS transistor, or a circuit having any one of these elements.

* * * * *